United States Patent [19]
Wehner et al.

[11] Patent Number: 5,692,798
[45] Date of Patent: Dec. 2, 1997

[54] VEHICLE FRAME WITH HOUSING FOR A SHOCK-ABSORBER

[75] Inventors: Frank Wehner; Jörg Hein, both of Steisslingen, Germany

[73] Assignee: Alusuisse Technology & Management Ltd., Switzerland

[21] Appl. No.: 766,100

[22] Filed: Dec. 17, 1996

[30] Foreign Application Priority Data

Jan. 12, 1996 [DE] Germany .................. 29600483 U

[51] Int. Cl.⁶ ............................................... B62D 25/08
[52] U.S. Cl. ....................................... 296/203; 296/194
[58] Field of Search ............................ 296/194, 203, 296/204; 280/788

[56] References Cited

U.S. PATENT DOCUMENTS

| | | | |
|---|---|---|---|
| 4,660,345 | 4/1987 | Browning | 296/205 |
| 5,052,742 | 10/1991 | Akoshima et al. | 296/192 |
| 5,320,403 | 6/1994 | Kazyak | 296/203 |
| 5,456,517 | 10/1995 | Kalian et al. | 296/194 |

FOREIGN PATENT DOCUMENTS

| | | |
|---|---|---|
| 2671320 | 7/1992 | France . |
| 4138373 | 6/1992 | Germany . |
| 4139329 | 6/1992 | Germany . |
| 4204825 | 6/1993 | Germany . |

*Primary Examiner*—Dennis H. Pedder
*Attorney, Agent, or Firm*—Bachman & LaPointe, P.C.

[57] ABSTRACT

A vehicle frame for powered vehicles with load-bearing sections and on these at least one housing for the upper end of a shock absorber; the housing is made of an extruded alloy, features a cover which is dished upwards, and is made up of a plurality of extruded shaped parts, each of which features shell-shaped sections which are curved in cross-section; projecting from the shell-shaped sections are at least two flange strips which serve as means for attachment to the neighbouring shaped part. The shaped part comprises shell-shaped sections each of which in cross-section is part of a circle and at the ends feature—as viewed in cross-section—flange strips running approximately radial to the central axis (B) of the housing.

20 Claims, 2 Drawing Sheets

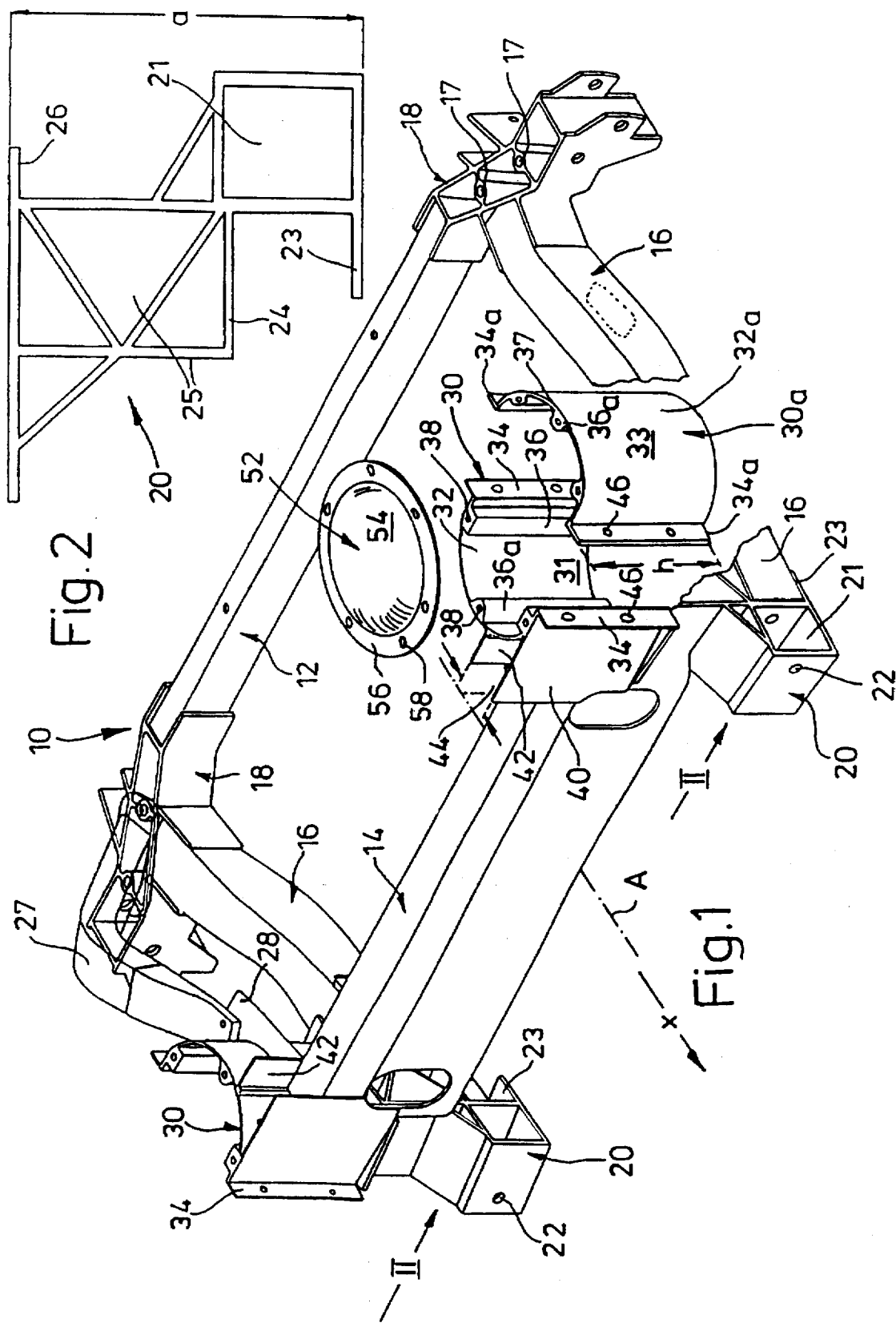

VEHICLE FRAME WITH HOUSING FOR A SHOCK-ABSORBER

BACKGROUND OF THE INVENTION

The invention relates to a vehicle frame for powered vehicles featuring load-bearing sections and on these at least one housing for the upper end of a shock absorber which is possibly inclined, said housing being made of an extruded alloy and provided with a cover the interior of which is dished upwards.

Such a vehicle frame is described in DE-OS 42 04 825. The housing for the shock absorber in that case is a one-piece, extruded, ring-shaped sleeve situated between hollow sections acting as support; on the outer surface of the ring-shaped sleeve and running parallel to one of their diameters are pairs of integral struts to which the supports are attached. Acting as a cover is a lid-like part which has been cast or is of sheet material and features an angled periphery which rests on the outer surface of the ting-shaped sleeve. The disadvantages of the ring-shaped sleeve are the difficulty of installing it and the presence of extrusion weld seams.

SUMMARY OF THE INVENTION

In view of this state-of-the-art the object of the present invention is to simplify and improve a vehicle frame, especially a frame for vehicles used on rough terrain, featuring housing(s) of the above mentioned kind but avoiding the known problems encountered in their manufacture, and to improve the stability thereof.

That objective is achieved by way of the present invention.

According to the invention the, preferably hollow, cylindrical housing is made up of a plurality of extruded parts, each of which features a shell-like section that is curved (as viewed in cross-section) and at least two flange strips which project out approximately radial from the shell-like sections and serve as connecting elements for the neighboring shaped part. The preferred material for that shaped part is an aluminum alloy.

According to another feature of the invention the extrudable shaped part comprises a curved shell-like section which is curved, as viewed in cross-section, and flange strips at the ends, as viewed in cross-section, running approximately radial to the central axis of the housing; the latter permit the shaped parts to be fitted together easily without applying heat.

In addition, it has been found favorable to provide at least one integral shaped rib on the shell-shaped section, preferably several thereof distributed along its cross-section. These shaped ribs run parallel to the strip flanges and therefore to the central axis of the housing. Thereby, the shaped ribs should be integral to the inner surface of the shell-like section and the strip flanges integral to the outer surface i.e. ribs and flanges are on opposite sides of the shaped part.

In order to increase the closing force between the shaped parts, it has been found favorable to appoint one of the shaped ribs to each strip flange, preferably a rib of approximately rectangular cross-section; the further shaped rib(s) situated between the two shaped ribs that are close to the edge of the shell section may exhibit a curved free cross-sectional contour.

According to the invention, the shaped ribs exhibit, on their end face which is approximately flush with an edge of the shell section, a housing opening for a connecting element, in particular a screw.

By means of this connecting element the already mentioned cover is attached to the shaped part, which offers the corresponding openings for the screw or the like, these openings preferably being situated in an edge region which is laid onto the rim of the of the shell housing and then connected to the shaped ribs by connecting elements. Further, a central plate of the cover or impact cup surrounds the contact edge, said central plate may if desired also be shaped dish-like out of the plane defined by the rim; in the installed condition the head of the shock absorber projecting into the housing is on the central plate.

Furthermore, the described housing is part of the load-bearing structure of the car frame. For that reason at least on one shaped part of the housing there is an approximately tangential integral connecting plate and a parallel plate which together define a gap for mounting the front transverse section of the vehicle frame or the like. The depth to which the gap can be penetrated may be restricted by stops in the form of ribs on the connecting plate and parallel plate.

It is also within the scope of the invention to provide the housing with a connecting part in the form of a grid-like section situated between a front transverse section and, at the side, a longitudinal section of the vehicle frame. This grid-like section may feature, on a box-like part thereof with an anchoring site for a lateral control arm or transverse control arm of the vehicle, two parallel plate elements between which that longitudinal section is positioned. A rear transverse section of the frame may be connected to both longitudinal sections by means of corner parts exhibiting facilities for accommodating additional parts.

According to another feature of the invention a curved stiffening arm, running from the corner piece to a connecting plate for the shock absorber, extends over each of the longitudinal side sections of the vehicle frame; the connecting plate encloses a part of the grid-like section.

The described construction leads e.g. to the following advantages:
the shaped parts and the grid-like section are solid sections; for that reason there are no problems due to extrusion welds;
the channels for the screws securing the cover or impact plate are integrated in the construction;
the channels for the screws may also be employed to accommodate the control arm;
the shock absorber section features strum for attaching parts of the frame by means of welding or bolting;
the shock absorber housing and the impact plate are fitted together mechanically; there can therefore be no problems due to tolerances.

BRIEF DESCRIPTION OF THE DRAWINGS

Further advantages, features and details of the invention are revealed in the following description of a preferred exemplified embodiment and with the aid of the drawing which show in:

FIG. 1 a perspective view of a vehicle frame for a private car;

FIG. 2 an enlargement of part of the vehicle frame shown as an end elevation in the direction indicated by the arrow II in FIG. 1;

Figure 4:
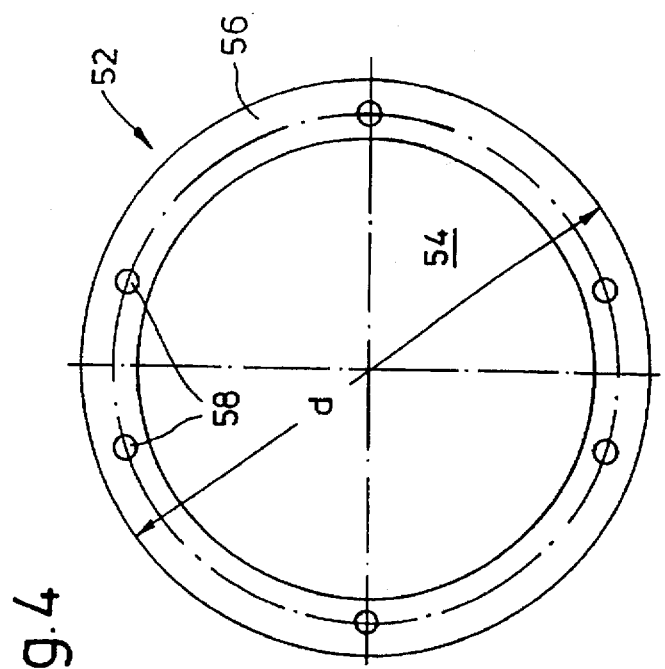
FIG. 4 a plan view of another part of FIG. 1.

The from region of a load-bearing structure belonging to the bottom part of a private car exhibits a frame 10 with, regarding the direction of driving, a rear transverse section 12, a front transverse section 14 and, running parallel to the longitudinal axis A of the vehicle which serves here as the axis of symmetry, pipe-shaped sections 16 running along the sides. The latter are connected to rear transverse section 12 corner pieces 18 exhibiting a plurality of holes. At the other end the longitudinal pipe-shaped sections 16 are connected to the front transverse section 14 by means of a grid-like-chamber section 20.

Provided on the outer box-shaped part 21 of grid-like section 20, of cross-sectional height a of 175 mm, is an anchoring point 22 for a transverse bar which for reasons of clarity is not shown here. Running out from this part 21 is a horizontal support 23 which serves as a support for the longitudinal pipe-shaped section 16 over which lies a parallel support plate 24. Connecting up with the latter is a framework or part 25 of the grid-like section, running upwards in FIG. 2, featuring an upper spar 26.

Curving over the left pipe-shaped section 16 is a stiffening arm 27, which is connected at the front end, as seen in the drawing, to a connecting plate 28 of the frame 10.

Figure 3:
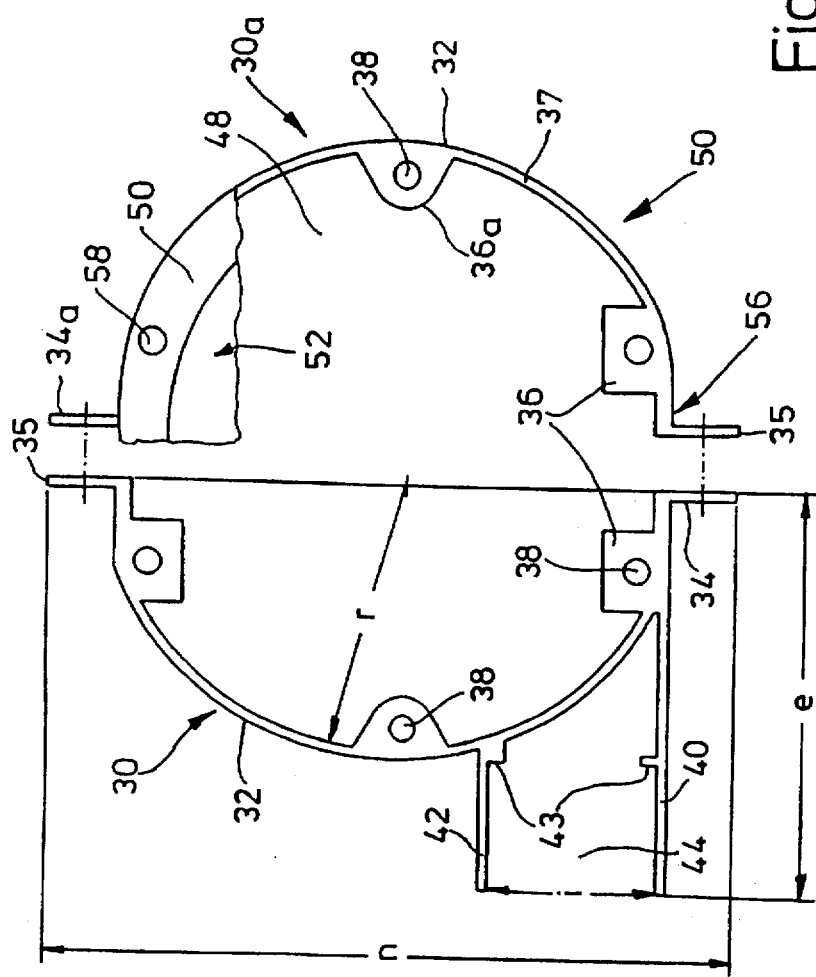
FIG. 3 a cross-section through a two part section of FIG. 1.

At each end of the front transverse section 14 is a shaped part made of an extruded aluminium alloy featuring—as viewed in cross-section—a shell-like section 32 which is approximately a segment of a circle and terminates in radial oriented integral flange strips 34 that run the full height h. As indicated, especially in FIG. 3, the outer edges 35 of the longitudinal flange 34 define a distance n which here is 205 mm.

Projecting out of the inner face 31 of the shell-shaped section 32 are three integral shaped ribs 36, $36_a$, running parallel to the flange strips 34. Two shaped ribs 36 lying close to the flange strips 34 are rectangular in cross-section; the third shaped rib 36 situated between them, preferably equidistant to them, is in the shape of a bulge which is almost triangular in cross-section. Each of these shaped ribs 36, $36_a$ features a hole 38 for a screw in their end faces which are almost flush with the end face 37 of the shell-shaped section 32.

On the outer face 33 of the shell-shaped section 32, tangential and close to the flange strip 34 at the front—as viewed in FIG. 1—is an integral connecting plate 40 of length e equal to 125 mm and lying a distance i from a parallel plate 42. The front transverse section 14 is mounted in a gap 44 of width i defined by plates 40, 42 and by stops 43 which are aligned with each other and project inwards from the plates 40, 42.

A further shaped part $30_a$, likewise comprising a shell-shaped section $32_a$ and two flange strips $34_a$, is laid onto the flange strips 34 of the described first shell-shaped section 30, whereby the openings 46 in the flange strips 34, $34_a$ are aligned with each other in order to accommodate connecting screws, rivets or the like which are not shown here.

Figure 5:
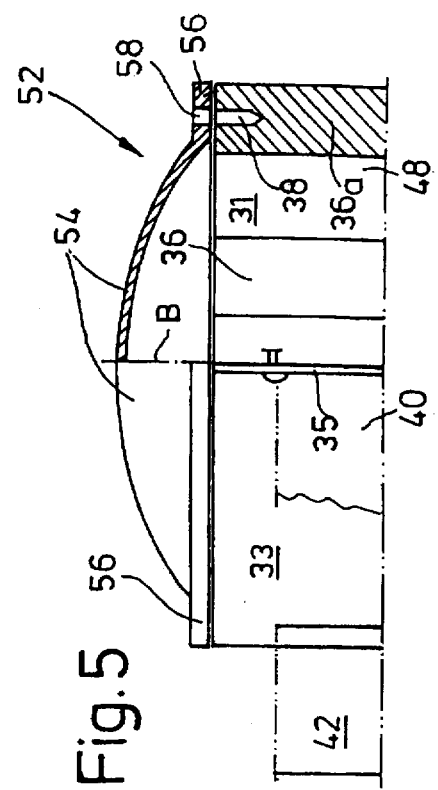
FIG. 5 cross-section through FIG. 4 along line V—V.

A dish-like cover or impact plate 52 is mounted as over the space 48 inside a cylinder-like pipe part 50 which is formed by the two shaped sections 30, $30_a$ and houses, not shown here, a shock absorber for a private car featuring e.g. a coil-type spring; this cover 52 is in the form of aluminum sheet or a forged part and comprises, shown with exaggerated doming in FIG. 5, a domed central plate 54 and a ring-shaped edge region 56 which rests on the cylinder-like part 50.

Screws which pass through the openings 58 in the edge region 56 into the tapped holes 38 in the integral ribs 36, $36_a$ hold the impact plate 52 of diameter d securely onto the cylinder-like pipe part 50—formed by the shaped sections 30, $30_a$, of inner radius r equal to approximately 80.45 mm. The central axis of the cylinder-like pipe part 50 is indicated by B in FIG. 5.

In exemplified embodiments not shown here the central plate 54 of the cover or impact plate 52 is not domed, as viewed in cross-section. Also, the holes 38 may be in the form of channels formed during extrusion in the shaped ribs 36, $36_a$ running parallel to the central axis, and may be used for securing the steering arm.

We claim:

1. Vehicle frame for powered vehicles, which comprises: load bearing sections; at least one housing on the load bearing sections for the upper end of a shock absorber; said housing being made of an extruded alloy; a cover for the housing, with an interior dished upwards, and the housing comprising a plurality of extruded shaped parts, each of which features a shell-like section which is curved in cross-section; and at least two flange strips projecting from the shell sections which serve as means for attachment to the neighboring shaped part.

2. Vehicle frame according to claim 1, wherein said shaped parts comprise shell sections which in cross-section is part of a circle and at the ends features, as viewed in cross-section, said flange strips running approximately radial to the central axis of the housing.

3. Vehicle frame according to claim 1, including at least one integral rib on each shell section.

4. Vehicle frame according to claim 3, wherein the integral rib runs parallel to the flange strips.

5. Vehicle frame according to claim 3, wherein said integral ribs are formed on the inner face of each shell section and the flange strips are formed on the outer face.

6. Vehicle frame according to claim 1, wherein each flange strip has an integral rib neighboring onto it.

7. Vehicle frame according to claim 5, wherein said integral ribs are uniformly distributed along the cross-section of each shell section.

8. Vehicle frame according to claim 3, wherein the integral rib is part rectangular in cross-section.

9. Vehicle frame according to claim 3, wherein the integral rib is bulge-shaped with a partially curved cross-sectional contour.

10. Vehicle frame according to claim 1, wherein the integral rib exhibits at least one hole for a connecting element, which is approximately flush with an end edge of each shell section.

11. Vehicle frame according to claim 1, wherein on at least one shaped part of the housing, and approximately tangential to it, an integral connecting plate and a plate are provided and jointly delimit a gap for mounting the housing onto a load bearing section.

12. Vehicle frame according to claim 11, including stops which determine the depth of the gap formed by the connecting plate and plate.

13. Vehicle frame according to claim 3, wherein the cover exhibits a rim for contact with the end edge of the shell sections and the rim overlies the integral ribs.

14. Vehicle frame according to claim 1, wherein the cover exhibits a central plate surrounded by a rim.

15. Vehicle frame according to claim 4, wherein the central plate is dish-shaped and is domed out of a plane defined by the rim.

16. Vehicle frame according to claim 1, including a grid-like section mounted on the housing which serves as a connecting member between a front transverse section and a longitudinal section of the vehicles frame.

17. Vehicle frame according to claim 16, wherein the grid-like section exhibits two parallel plate-shaped elements on a box-shaped section with an anchoring site for a vehicle lateral or transverse control arm, and the longitudinal section is mounted between these elements.

18. Vehicle frame according to claim 16, including a rear transverse section of the frame connected to the longitudinal section by a corner piece featuring a connection housing.

19. Vehicle frame according to claim 18, including a curved stiffening arm provided over the longitudinal side section and joined to the corner piece and a connecting plate neighboring the housing.

20. Vehicle frame according to claim 19, wherein the connecting plate spans a part of the grid-like section.

* * * * *